(12) United States Patent
Robinson, Jr.

(10) Patent No.: US 8,469,286 B2
(45) Date of Patent: Jun. 25, 2013

(54) SYSTEM AND METHOD FOR APPLICATION AND DISPERSAL OF A MATERIAL FOR MATING DISRUPTION AND INSECT POPULATION CONTROL

(75) Inventor: Richard David Robinson, Jr., Fort Pierce, FL (US)

(73) Assignee: International Flymasters, Inc., Fort Pierce, FL (US)

( * ) Notice: Subject to any disclaimer, the term of this patent is extended or adjusted under 35 U.S.C. 154(b) by 106 days.

(21) Appl. No.: 12/876,886

(22) Filed: Sep. 7, 2010

(65) Prior Publication Data

US 2011/0139899 A1    Jun. 16, 2011

Related U.S. Application Data

(60) Provisional application No. 61/240,099, filed on Sep. 4, 2009, provisional application No. 61/240,103, filed on Sep. 4, 2009.

(51) Int. Cl.
*A01G 25/09*    (2006.01)
(52) U.S. Cl.
USPC ........................................... 239/146; 239/328
(58) Field of Classification Search
USPC ................. 239/146, 147, 149, 171, 172, 302, 239/337, 67, 68, 69, 58, 600, 328
See application file for complete search history.

(56) References Cited

U.S. PATENT DOCUMENTS

| 5,334,987 | A | * | 8/1994 | Teach | 701/3 |
| 5,520,333 | A | * | 5/1996 | Tofte | 239/10 |
| 5,704,546 | A | * | 1/1998 | Henderson et al. | 239/1 |
| 5,890,445 | A | * | 4/1999 | Ridgley | 111/119 |
| 7,516,907 | B2 | * | 4/2009 | Slone et al. | 239/146 |

* cited by examiner

*Primary Examiner* — Davis Hwu
(74) *Attorney, Agent, or Firm* — Greenberg Traurig, LLP

(57) ABSTRACT

A system and method of application and dispersion of mating disruption materials or other materials to control insect population. Disclosed is an apparatus designed to be carried by a ground vehicle, or aerial means, which implements a method of insect population control. The apparatus features one or more removable vacuum reservoirs that contain a mating disruption formulation in cylinders or bags. The vacuum bags or vacuum cylinders are seated upon one or more computer controlled peristaltic pump heads, housed in a insulated controlled environment box, that pump the material to one or more forming nozzles. Once formed the material drops into the wind stream of one or more tangential vortex type fans. Maintaining its size and shape, the mating disruption material will travel through the air field, and become attached in the trees where it will omit a flume of sex pheromones that disrupt the ability of the male insect in finding the female insect, breaking the mating cycle of the insect population. Thus serving to decrease the population by capitalizing on a weakness in the reproductive cycle of the citrus leaf miner or other insect.

13 Claims, 5 Drawing Sheets

PLASTIC VACUUM HEAT SEALED COMMERCIAL SPRAY BAG

GROMET INSERT FOR HANGING ABOVE PUMP

REINFORCES CORNERS WITH DOUBLE HEAT SEALS FOR DURABILITY

½ INCH PLASTIC DISCHARGE PORT

ROUNDED INTERNAL CORNERS FOR COMPLETE PRODUCT ESCAPE

3/8 STAINLESS EXIT TUBE INSERT THREADED ON BOTTOM END

STAINLESS HOSE CLAMP

3/8 FEMALE THREADED X 3/8 FEMALE QUICK DISC CONNECT FOR CONNECTION TO PUMP HEAD

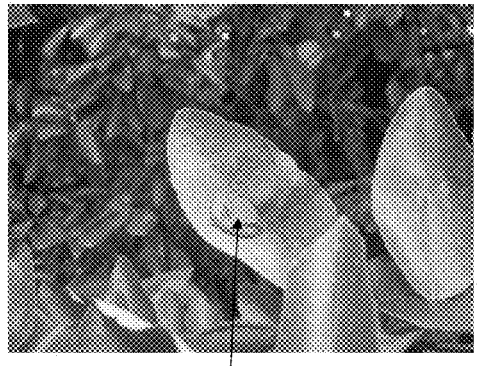
Fig. 1: ONE GRAM DOLLOP OF SPLAT MECHANICALLY APPLIED ON CITRUS
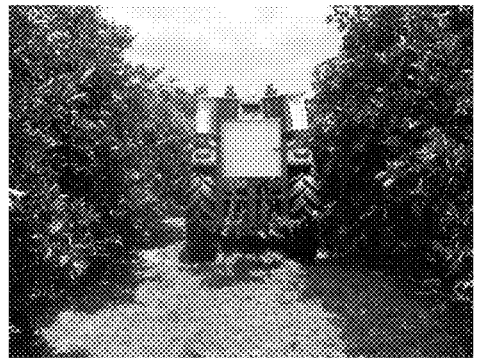
Fig. 2: MATTING DISRUPTION APPLICATION IN COMMERCIAL CITRUS GROVE
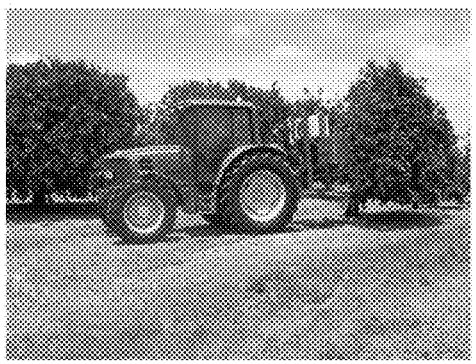
Fig. 3: MATTING DISRUPTION APPLICATOR MOUNTED ON A JOHN DEERE 6430
Fig. 4: FORMING NOZZLE MOUNTED ABOVE THE FAN DISCHARGE

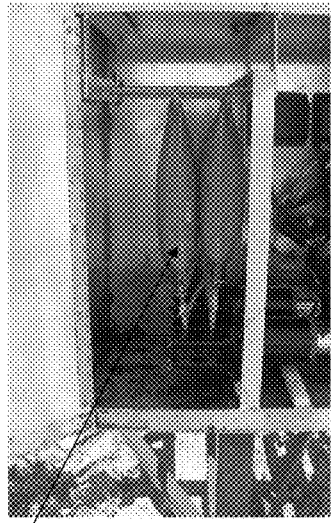
Fig. 5: REMOVABLE EASY LOAD PLASTIC VACUUM SPRAY BAGS ATTACHED TO PERISTALTIC PUMP HEADS
Fig. 6: SPLAT DOLLOP DROPING FROM FORMING NOZZEL
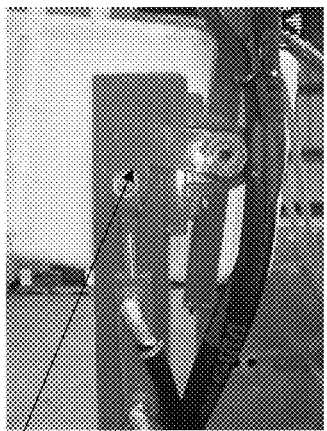
Fig. 7: HYDRAULICALLY OPERATED FAN TRAJECTORY SYSTEM
Fig. 8: GIMBAL MOUNTED TWO FOOT TANGENTIAL VORTEX TYPE FAN

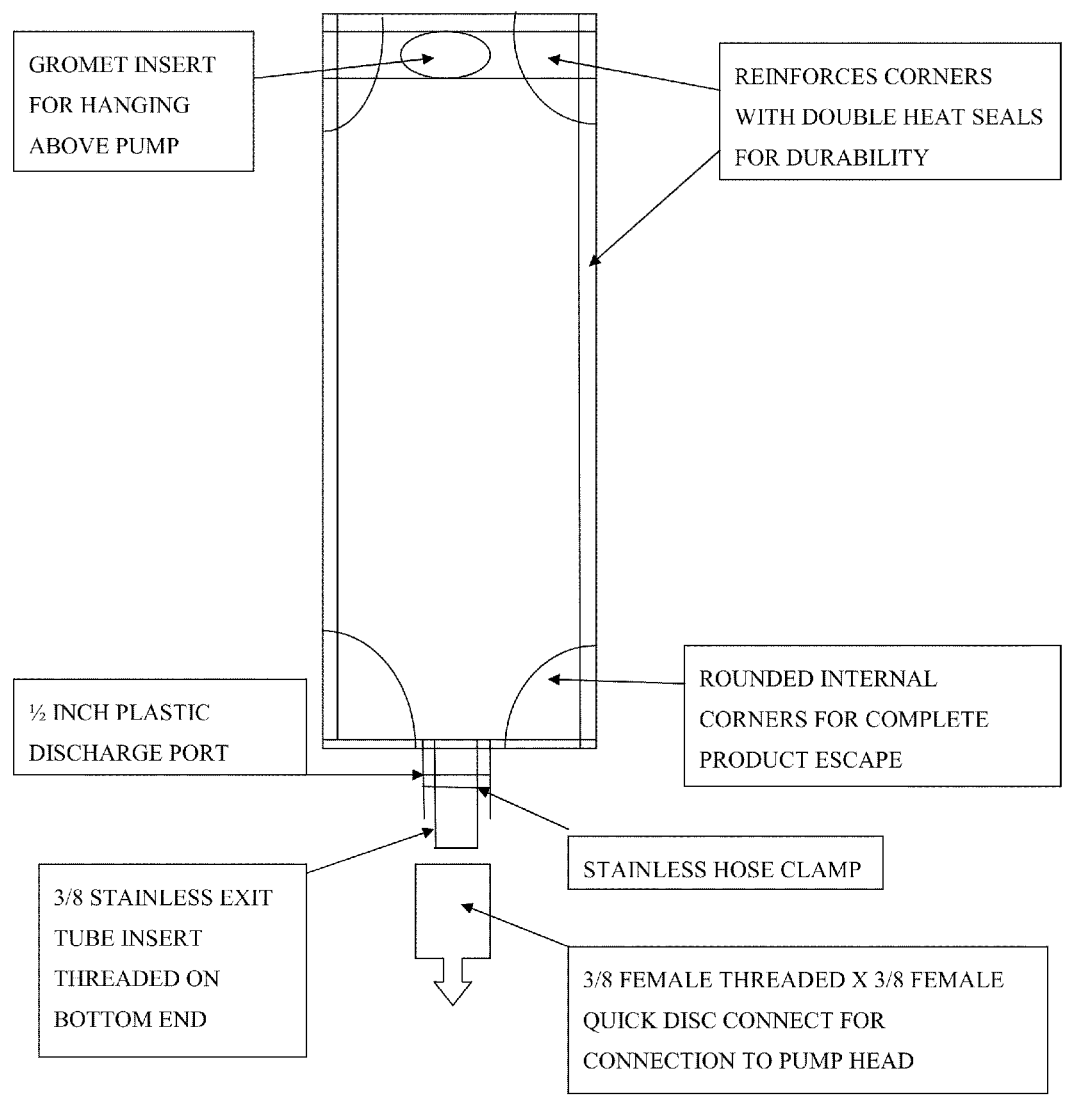
FIGURE 9: PLASTIC VACUUM HEAT SEALED COMMERCIAL SPRAY BAG

FIGURE 10    ELECTRONIC COMPOENTS
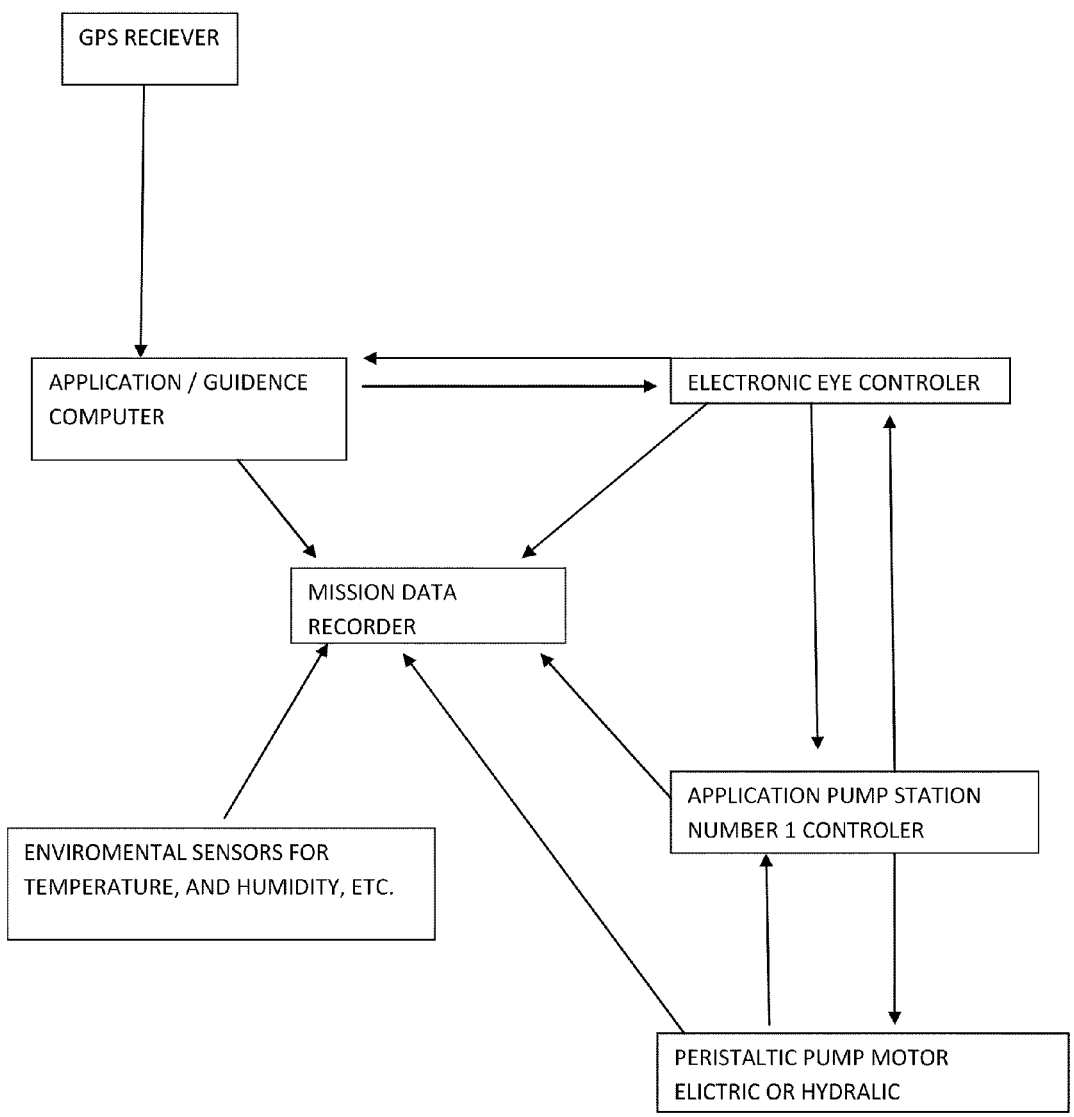

SYSTEM AND METHOD FOR APPLICATION AND DISPERSAL OF A MATERIAL FOR MATING DISRUPTION AND INSECT POPULATION CONTROL

This application claims priority to U.S. Provisional Patent Application No. 61/240,099 filed Sep. 4, 2009, and U.S. Provisional Patent Application No. 61/240,103 filed Sep. 4, 2009, the entire disclosures of which are incorporated herein by reference. This application includes material which is subject to copyright protection. The copyright owner has no objection to the facsimile reproduction by anyone of the patent disclosure, as it appears in the Patent and Trademark Office files or records, but otherwise reserves all copyright rights whatsoever.

FIELD OF THE INVENTION

In general the field of the invention relates to insect control. Specifically, the field of the invention relates to a machine to mechanically deliver an ultra low volume amount of a material, loaded with an organic or inorganic material and method for ground and airborne dispersion of the material for insect population control

BACKGROUND OF THE INVENTION

Insects, and the damage they cause, are a serious economic threat to farmers worldwide. Insects such as the citrus leaf miner, *Phyllocnistis citrella*, a major pest of citrus worldwide result in reduced growth rate of young citrus trees and cause extensive damage to new growth which in turn causes a significantly higher instance of citrus canker. Importing countries, for example, will block fruit and vegetable shipments from certain exporting countries, rather than risk their phytosanitary status by importing foreign fruits, vegetables and other agricultural products from areas infested with crop damaging insects and diseases.

The larvae stage of the citrus leaf miner is difficult to control because they are protected within the leaf tissue. The insect larvae can also damage and blemish the external surface of the fruit resulting in fruit loss and grade lowering blemishes. Economic loss is suffered from the diminished fruit value, lack of normal tree growth, lower production per acre, and the increased infection rate of citrus canker.

Semiochemicals (pheromones, allomones, kairomones, attractants, and repellents) can alter or interfere with behavior of insect pests of citrus, pecans, peach, ornamentals, grapes, nursery and horticulture crops. Various devices for release of insect semiochemicals (e.g., sex pheromones) are used. An emulsified wax formulation (SPLAT™, ISCA Technologies) was developed for machine application and slow release of semiochemicals over weeks to months, providing environmentally appropriate control compatible with management practices. Use of SPLAT is limited by difficulties specific to its use as a viscous liquid.

Mating disruption is an essential component of integrated pest management, IPM, programs for major pest reduction worldwide in fruit crops, forage crops, forestry, and stored product warehouses. This method of pest control also reduces the need for the application of broad spectrum insecticides.

SUMMARY OF THE INVENTION

The invention includes a novel apparatus and method which allows for the application and distribution of mating disruption or attract and kill formulations in a controlled manner to control the population of a given species.

Additional features and advantages of the invention will be set forth in the description which follows, and in part will be apparent from the description, or may be learned by practice of the invention. To achieve these and other advantages and in accordance with the purpose of the present invention, as embodied and broadly described, there is provided an apparatus and a device for utilization with an aerial platform or ground vehicle that advantageously dispenses a mating disruption material, in a controlled and efficient matter in accordance with a method of population control.

Current technologies for application of semiochemicals contained in SPLAT, and other products, consist of either hand-held guns similarly to caulking guns, grease guns, putty knives, back pack pressurized applicators, or a vehicle-mounted boom that delivers inconsistent sized dollops of SPLAT by dropping them onto foliage These approaches typically suffer from a number of limitations including:
- difficulty in controlling droplet size
- Product is extremely viscous and difficult to pump at consistent rates
- Product is not dispersed uniformly over the application field
- size and volume of droplets vary according to delivery method
- inconsistent application rate per acre due to the speed of vehicle, viscosity changes, terrain characteristics
- A majority of the product is applied to the outer canopy and subjected to adverse environmental conditions such as excessive sun and rain
- Mating disruption pheromones for citrus leaf miner are very expensive, are labeled for uses at very small quantities per acre and are wasted if the material is not applied properly to the crop
- High labor cost associated with hand applications
- Limited daily acres covered due to slow hand application devices In certain embodiments, the presently disclosed delivery machine overcomes these limitations and:
- delivers a consistent dollop
- Vacuum reservoir maintains a constant flow rate to the peristaltic pump
- Peristaltic pumps are calibrated to a set volume dispensed per pump revolution, which is highly accurate
- Material viscosity is maintained in a controlled environment inside the pump station box
- product is delivered using a computer controller that controls the RPM's of the pump head based on a programmed calibration number which is used to compensate the pump output based on the speed of the vehicle
- prescription application maps can be designed to deliver exact rates to crop fields, which reduce cost and excessive product application into the environment
- The product output is controlled by an electronic eye system so that the product is not wasted in tree rows with vacant areas
- the product is wind driven into the targeted crop
- The mechanical application machine can cover 300 acres or more per day with one operator which increases the acres per day treated at reduced cost
- product can be applied by hand, manual ground system, automated ground systems, or by aircraft, helicopter or fixed wing It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention FIG. 1 is an example of a one gram mechanically applied dollop of SPLAT FIG. 2 is a view of the application machine in a commercial grove FIG. 3 is a view of the applicator mounted on a tractor FIG. 4 is a view of the forming nozzle mounted above the fan housing FIG. 5 is a view of the heat sealed vacuum spray bags FIG. 6 is a view of a SPLAT dollop dropping from the forming nozzle FIG. 7 is a view of the hydraulically operated fan trajectory system FIG. 8 is a view of the two foot tangential fan housing FIG. 9 is a design diagram of the heat sealed vacuum spray bags in accordance with an embodiment of the invention FIG. 10 is a block diagram illustrating the electronic control system in accordance with an embodiment of the invention

DETAILED DESCRIPTION OF A PREFERRED EMBODIMENT

Figure 11:
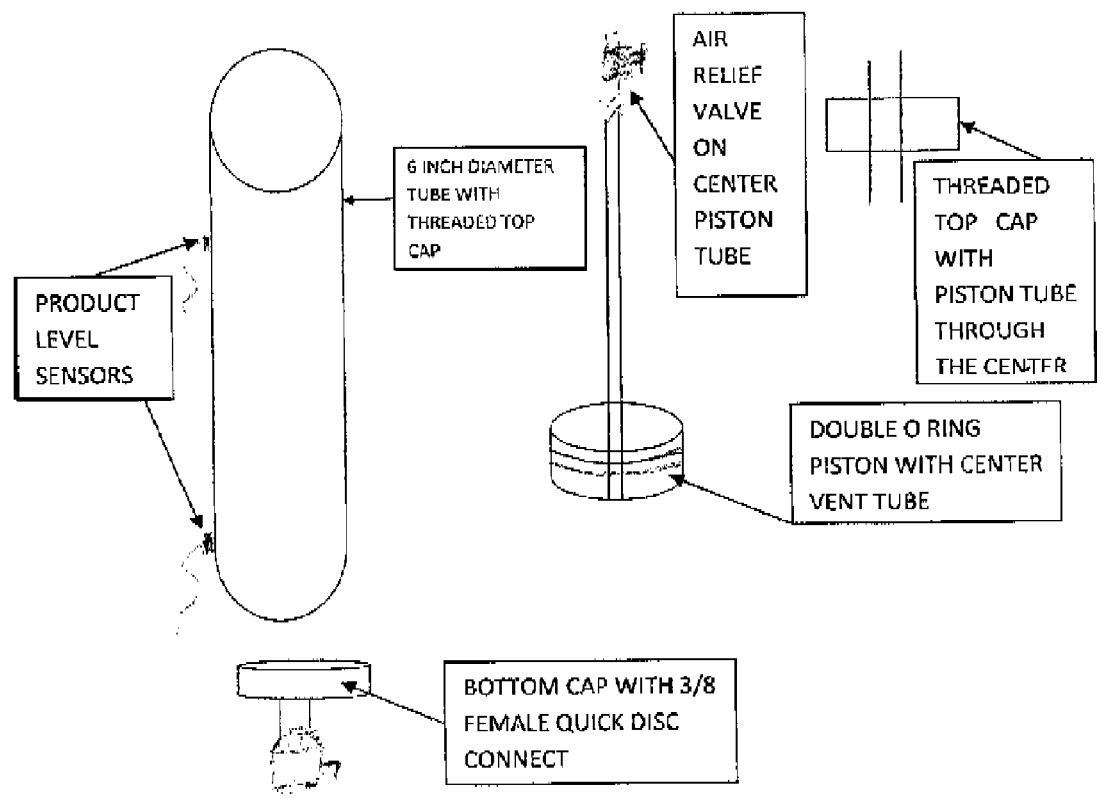
FIG. 11 is a block diagram illustrating the vacuum cylinder reservoir system in accordance with an embodiment of the invention.

A novel machine has been developed to apply ultra low volumes of semiochemicals at specified droplet or dollop sizes. Utilizing SPLAT as a delivery vehicle to blend the semiochemicals into and apply this material at 200 grams per acre in one gram dollops is a unique configuration with wide application across many crops. The machine delivers an effective approach for reducing citrus leaf miner damage and associated citrus canker. The device consists of one or more reservoirs containing or holding an insect sex pheromone or other semiochemical or an attract and kill agent incorporated into SPLAT, MalEX or other release agent. Examples include but are not limited to SPLAT-CLM, SPLAT-MAT, SPLAT-GM, SPLAT-PBW, SPLAT-Cydia, SPLAT-LBAM, SPLAT-GBM, MalEx, Last Call, or deterrants. The material can be consistently pumped by one or more peristaltic pump heads connected to one or more vacuum bags or vacuum reservoirs and pumped through an adjustable forming nozzle and delivered into the wind stream. The mechanical precision delivery device has application in many specialty crops and provides a flexible and economically advantageous tool for non-insecticidal or insecticidal pest control.

The female leaf miner can attract a male from distances of 40 yards or more. One successful mating of the female leaf miner can result in 100 or more fertilized eggs.

Deploying a synthetic pheromone into the crop atmosphere to interfere with normal mate finding abilities is known as mating disruption. These synthetic pheromones are volatile chemicals that mimic the natural sex pheromones given off by the female insect. Consequently there is a significant reduction in successful insect mating.

The CPU system for the mating disruption delivery machine is linked to the on-board navigation system to allow release rates to be continuously adjusted to compensate for ground speed or air speed variation. The application machine is also linked to its own GPS driven computer control system which permits precise application programming and post application records for application validation and management.

FIG. 5 is a block diagram illustrating the electronic control system in accordance with an embodiment of the invention. The electronic control system of the invention in its preferred embodiment controls the dispensing of insect pheromone mixture (or other materials) by using the outputs from commercially available GPS Guidance Systems. A guidance system is programmed with the desired geographic dispensing areas and dispensing rate. When a geographic area to be treated is entered, a signal is sent to the machine to start dispensing. The guidance system determines the dispensing rate based on the ground speed of the vehicle. The ground speed value is multiplied by the desired application rate. This value is broadcast, preferably using serial bus communications, to all of the pump stations. Each pump stations will deliver units at a rate to reflect the desired dispensing rate. The dispensing rate is specified in a value of grams dispensed per acre. Variations of the ground speed would speed up or slow down the peristaltic pump head to maintain the desired dispensing rate. The pump stations are individual control units. Each pump control has programmable dispensing rate scaling. The scaling allows multiple hoppers to have different dispensing rates. Scaling is beneficial when different materials are to be dispensed during the same mission. For example, a scaling rate of 1 will result in dispensing at the rate programmed into the navigation guidance system, and a scaling rate of 0.5 will result in dispensing at ½ the rate programmed into the navigation guidance system. Each pump station preferably has a self-contained control system such that, if a malfunction occurs with one, the others will continue to function. Each reservoir container has level sensors to determine when a chamber has been emptied. As the reservoir is emptied the level sensors eliminate a light bar to inform the operator of the current material level in the reservoir. The pump station is also interfaced with an electronic eye system which can be operated on manual or automatic. The eye system determines if there is a tree present in the application zone and allows the pump to run, if there is no tree present the pump will not disperse the material.

The control scheme is preferably designed as a modular system. In the preferred embodiment, the components of the control system and their functions are as follows.

Human Interface Console

The console receives the pre-programmed mission parameters from the Navigation Guidance System, and then broadcasts the information to the pump control units. The console also serves as an interface to the reservoir control units. The operator has indicator lights to show the exact level of reservoirs being emptied. The console is also interfaced with an electronic eye system that determines if there is a tree present in the application zone and can be operated in a manual mode or an automatic mode.

Pump Dispensing Controllers

The dispensing control receives mission parameters to control dispensing rate and dispensing on/off. Dispensing on/off is controlled by the Navigation Guidance System, the operator override switch, and the electronic eye system. The controller light bar monitors the volume of the hopper.

Mission Data Recorder

A digital data recorder is preferably provided for recording mission parameters for verification and quality control purposes. Information that can be recorded includes, but is not limited to: GPS information, latitude, and longitude, altitude, actual dispensing rate of each pump station, ground speed, air temperature, and relative humidity.

FIG. 11 shows a vacuum cylinder reservoir. The vacuum cylinder reservoir may be constructed out of PVC, aluminum, or stainless steel. The top and bottom of the cylinder are threaded to accept a top cap and a bottom cap. The bottomo cap has a half-threaded tube that extends out approximately one inch with a female quick disconnect fitting attached to the end. This is connected to the suction side of the peristaltic pump. material is loaded into the cylinder from the top and the center piston is inserted into the cylinder. The center piston has a 3/8" tube threaded through the piston so that it is flush with the bottom of the piston. A 3/8" air relief valve is threaded onto the tube at the top to evacuate the excess air out when the user places the piston into the loaded cylinder. The center piston has two grooves for the o-ring seals. The top cap slides on the piston rod and rides below the relief valve and is screwed onto the cylinder reservoir.

When the quick-disconnect fitting is attached to the pump, the pump pulls a vacuum on the column of material and gradually pulls the center piston downward as the material is dispensed.

While the invention has been described in detail and with reference to specific embodiments thereof, it will be apparent to those skilled in the art that various changes and modifications can be made therein without departing from the spirit and scope thereof. Thus, it is intended that the present invention cover the modifications and variations of this invention provided they fall within the spirit and the scope of the invention as described herein. One of ordinary skill in the art will recognize that the present invention can be modified to accommodate the dispensing of other materials which are subject to the same parameters, without departing from the spirit and scope of the invention. Examples of such means include, e.g., attract and kill bait stations, and other biological control materials applied at ultra low volume rates Such means would each benefit from the ability to control the, droplet diameter, volume per droplet, number of droplets per acre, quality control data, and or the verification by GPS that are provided by the invention.

Furthermore, although the invention in its preferred embodiment as described herein is utilized for ground applications, it will be understood by those skilled in the art that the invention can be utilized for aerial applications without departing from the spirit and scope of the invention.

The invention claimed is:

1. A system for applying mating disruption materials or bait stations into an insect population, the system comprising:
   a base frame secured to a carrying vehicle or aircraft;
   at least one removable evacuated container attached to the base, said removable evacuated container comprising a collapsing vacuum container;
   a semiochemical comprising an insect sex pheromone or an attract and kill agent, within said container;
   at least one peristaltic pump head connected to said container and configured to pump said semiochemical through an adjustable forming nozzle, said adjustable forming nozzle being adjustable in size to determine the size of a dollop of material which is pumped out of the nozzle, whereby said semiochemical is delivered into a wind stream.

2. The system for applying mating disruption materials according to claim 1, wherein said removable evacuated container comprises a vacuum bag or vacuum reservoir.

3. The system for applying mating disruption materials according to claim 1, further comprising a CPU and a motor for controlling the pump mechanism, wherein the speed of cycles of said motor determines the rate of units dispensed into an exit forming nozzle or chute.

4. The system for applying mating disruption materials according to claim 1, further comprising global positioning system capability, and wherein the system is configured such that a predetermined amount of units can be applied in a predetermined geographic location.

5. The system for applying mating disruption materials according to claim 1, wherein the system is configured to maintain a consistent viscosity of the material.

6. The system for applying mating disruption materials according to claim 1, wherein the system is configured to hold a pre mixed material in the evacuated container so as to allow the pump to maintain a constant vacuum on the material and maintain a constant discharge rate.

7. The system for applying mating disruption materials according to claim 1, wherein the system is configured to discharge the material in a desired shape and volume at a rate of 75 grams per acre or higher through the forming nozzle.

8. The system for applying mating disruption materials according to claim 1, wherein the system is configured to deliver large droplets of approximately 1 gram each into the wind stream and apply them to a tree or crop foliage at a rate of approximately 75 grams or higher per acre.

9. The system for applying mating disruption materials according to claim 1, wherein the system is configured to control and set application wind speed based on specific crop and tree spacing.

10. The system for applying mating disruption materials according to claim 1, wherein the system is configured to control the trajectory of mating disruption material when it is delivered into the wind stream.

11. The system for applying mating disruption materials according to claim 1, further comprising an adjustable forming chamber to allow for the proper size droplet to be dispersed.

12. The system for applying mating disruption materials according to claim 1, wherein the system is configured to allow for the consistent pumping of a highly viscous material at a constant rate.

13. The system for applying mating disruption materials according to claim 1, wherein said adjustable forming nozzle has a width and a height which are adjustable to determine the size of the dollop of material which is pumped out of the nozzle.

* * * * *